United States Patent
Fritz et al.

(10) Patent No.: US 6,788,873 B2
(45) Date of Patent: Sep. 7, 2004

(54) METHOD OF HERMETICALLY SEALING A FIBER OPTIC LIGHT GUIDE IN A METALLIC FEEDTHROUGH SLEEVE WITH GLASS SOLDER AND HERMETICALLY SEALED FEEDTHROUGH DEVICE MADE THEREBY

(75) Inventors: Oliver Fritz, Altdorf (DE); Andreas Steinberg, Vilsheim (DE)

(73) Assignee: Schott Glas, Mainz (DE)

( * ) Notice: Subject to any disclaimer, the term of this patent is extended or adjusted under 35 U.S.C. 154(b) by 2 days.

(21) Appl. No.: 10/305,293

(22) Filed: Nov. 26, 2002

(65) Prior Publication Data
US 2003/0152356 A1 Aug. 14, 2003

(30) Foreign Application Priority Data
Dec. 1, 2001 (DE) .......................................... 101 59 093

(51) Int. Cl.$^7$ ................................................. G02B 6/00
(52) U.S. Cl. .................................................... 385/138
(58) Field of Search ........................................ 385/138

(56) References Cited

U.S. PATENT DOCUMENTS

| | | | |
|---|---|---|---|
| 3,250,631 A | | 5/1966 | Lusher et al. |
| 4,357,072 A | | 11/1982 | Goodfellow et al. |
| 4,691,985 A | * | 9/1987 | Shank et al. .................. 385/84 |
| 4,904,046 A | | 2/1990 | Paschke et al. |
| 5,177,806 A | * | 1/1993 | Abbott et al. .................. 385/76 |
| 5,337,387 A | | 8/1994 | Kramer .......................... 385/76 |
| 6,400,884 B1 | * | 6/2002 | Matano et al. ................ 385/137 |

FOREIGN PATENT DOCUMENTS

| | | |
|---|---|---|
| DE | 34 31 748 A1 | 3/1986 |
| EP | 0 105 198 A2 | 4/1984 |
| EP | 0 274 222 B1 | 3/1993 |
| EP | 0 332 046 B1 | 5/1995 |
| FR | 2 693 559 | 1/1994 |
| GB | 1042782 | 9/1966 |
| WO | 88/04437 | 6/1988 |

\* cited by examiner

Primary Examiner—Javaid H. Nasri
(74) Attorney, Agent, or Firm—Michael J. Striker

(57) ABSTRACT

To hermetically seal a fiber optic light guide (1) in a stripped or de-coated state, I.e. the bare optical fiber (2), in a feedthrough sleeve (5) the bare optical fiber (2) is sealed together with the feedthrough sleeve (5) by composite-glass solder with local heating. To make a permanent hermetic glass seal, the feedthrough sleeve (5) is made from an Invar alloy with very low thermal expansion and the composite-glass solder is low-melting with thermal expansion properties adapted to the alloy. The composite-glass solder is molded into prefabricated half-cylinder-shaped pressed parts (7) in a press/sinter technology process, The stripped optical fiber (2) is inserted between the pressed parts (7) arranged in the feedthrough sleeve (5) and sealed by melting the pressed parts together with each other and with the stripped optical fiber and feedthrough sleeve.

21 Claims, 4 Drawing Sheets

METHOD OF HERMETICALLY SEALING A FIBER OPTIC LIGHT GUIDE IN A METALLIC FEEDTHROUGH SLEEVE WITH GLASS SOLDER AND HERMETICALLY SEALED FEEDTHROUGH DEVICE MADE THEREBY

BACKGROUND OF THE INVENTION

1. Field of the Invention

The present invention relates to a method of hermetically sealing a fiber optic light guide in a metallic feedthrough sleeve by means of glass solder and to a hermetically sealed feedthrough device made by this method.

2. Description of the Related Art

Modern networks for telecommunication and internet (data highways) use fiber optic light guides, i.e. fiberglass cables, for data transmission, which comprise bundles of individual optical fibers. The fiber optic light guide has a glass core, which is surrounded by a light-tight jacket or coating.

Because of the growth of this sort of fiber optic network a great need has arisen for feedthrough devices for individual fiber optic light guides, i.e. individual optical fiber guides, for example in hybrid housings with converters for converting optical signals into electrical signals. The housing hermetically seals electro-optic components, which must be protected from the action of corrosive media, moisture and the like. These feedthrough devices must be permanently hermetically sealed for this purpose, so that these components are reliably and continuously protected.

A series of methods are already known for making hermetic feedthroughs.

In a known device for hermetically sealing a fiber optic light guide (DE 34 31 748), two feedthrough elements are provided, which must be attached and sealed to the wall and/or the fiber optic light guide and after that with each other. That is troublesome and time-consuming. It can cause a series of errors.

In another known feedthrough for a fiber optic light guide (U.S. Pat. No. 4,357,072) the exposed fiber optic light guide is metallized and is sealed with the wall with metallic solder. The metallization of a fiber optic light guide made from glass is expensive and can easily involve production of faults or errors. A protection against bending for the portion of the fiber optic light guide extending out of the feedthrough is not possible in a simple manner.

In the EP-A 0 105 198 a pressure-tight and gas-tight-fiber optic-light-guide feedthrough is described, in which a fiber optic light guide without surrounding protective layer is sealed in a feedthrough sleeve by melting or fusion of low-melting glass. It opens at respective ends into a plug connector. Two plug connectors are also provided on the entrance and outlet sides of the feedthrough sleeve for the fiber optic light guide, with which disadvantageous coupling losses unavoidably occur in or during connection of the fiber optic light guide.

In practice methods for making hermetically sealed feedthrough devices are known, in which a metallic sleeve is provided, through which a glass fiber is guided and, for example, bonded to a feedthrough sleeve by means of epoxy adhesive or by spraying liquid metal soft solder into the sleeve. In the latter case the glass fiber is first metallized. The feedthrough sleeve is then soldered to the wall of a hybrid housing. This process, above all the adhesive techniques, however produces no permanent hermetic seal.

It is also known (EP 0 332 046 B1), to attach and seal the through-going fiber optic light guide in a feedthrough sleeve by means of glass solder and to hermetically seal the feedthrough sleeve itself similarly in a wall opening by means of glass solder.

Also EP 0 274 222 discloses a feedthrough with a metallic sleeve, in which the fiber optic light guide is attached by means of glass solder.

This known glass solder process includes sealing by means of glass solder capillaries. No satisfactory results are produced with this process, because of significant mismatching of the thermal expansion coefficients. These glass solder capillaries are only made from stable glass solder. They have comparatively high thermal expansion coefficients, usually greater than 10 ppm/K. Melting temperatures, which lead to extreme thermal damage (brittlization) of the fibers, were required for capillaries made of drawable stable glasses with small thermal expansion coefficients, e.g. $\alpha \cong 5$ ppm/K. Because of that first no worthwhile hermetic seal is possible in a metallic sleeve with $\alpha \cong 5$ ppm/K, i.e. in a sleeve made of a material, which is preferred for electro-optic housings because of its small thermal expansion properties. Also the high diathermic mismatch—dependent on stresses—causes attenuation of optical signals.

SUMMARY OF THE INVENTION

It is an object of the present invention to provide a method of hermetically sealing a fiber optic light guide in a metallic feedthrough sleeve with glass solder, which produces a permanent hermetically sealed feedthrough device and is performed with comparatively simple process technology.

It is a further object of the present invention to provide a suitable permanent hermetically sealed feedthrough device in a comparatively simple manner.

According to the invention this object is attained by a method for hermetically sealing a fiber optic light guide in a metallic feedthrough sleeve by means of glass solder, which comprises the steps of:

a) preparing a feedthrough sleeve consisting of a metallic material, which comprises an invar alloy;

b) removing at least one protective layer from the fiber optic light guide to expose a glass fiber;

c) preparing two half-cylinder-shaped pressed parts made from a low-melting composite-glass solder with thermal expansion properties adapted to the material of the feedthrough sleeve, the half-cylinder-shaped pressed parts having respective axial grooves with corresponding cross-sections corresponding to a diameter of the exposed glass fiber;

d) assembling both half-cylinder-shaped pressed parts together with the exposed glass fiber in the axial grooves of the half-cylinder-shaped pressed parts; and e) melting the half-cylinder-shaped pressed parts with each other together with the glass fiber and the feedthrough sleeve by local heating.

In regard to the hermetic sealing of the fiber optic light guide in the metallic feedthrough sleeve by means of glass solder, the method according to the invention is successful. In this method the feedthrough sleeve is made of an invar alloy and the glass solder from the low-melting composite-glass solder with a thermal expansion that corresponds to that of the material of the feedthrough sleeve. The feedthrough sleeve is formed from the prefabricated half-cylinder-shaped pressed parts of low-melting glass solder, between which the optical fiber is embedded after removal of its protective jacket or layers.

Because of the features of the inventive method it is comparatively easy to provide a permanent hermetically sealed feedthrough device.

Additional features of preferred embodiments are set forth in the dependent claims appended hereinbelow.

In a particularly preferred embodiment the feedthrough sleeve is provided with a first axial section having a first interior diameter, which is filled with adhesive around the fiber optic light guide and the at least one protective layer is removed from only a portion of the fiber optic light guide in the first axial section. The feed through sleeve has a second axial section having a second interior diameter for receiving the half-cylinder-shaped pressed parts, this second interior diameter being greater than the first interior diameter.

In further preferred embodiments the Invar alloy consists of a Ni—Co—Fe alloy, a Fe—Ni—Cr alloy or a Fe—Ni alloy. Gold coating the feedthrough sleeve facilitates sealing the optical fiber light guide in it with the glass solder.

Advantageously the half-cylinder-shaped pressed parts are made with a process according to press/sinter technology. In this process the half-cylinder-shaped pressed parts of the composite-glass solder can be made from a lead-borate glass with an inert expansion-lowering filling material, especially β-Eucryptite. Alternatively, they can be made from a composite-glass solder consisting of a phosphate glass with an inert expansion-lowering filling material.

The local heating for local thermal sealing takes place by means of an electrically heated incandescent filament, inductively, by means of focussed infrared radiation or in an oven.

The hermetically sealed feedthrough device for hermetically sealing a fiber optic light guide according to the invention comprises a metallic feedthrough sleeve consisting of a metallic material, which comprises an invar alloy, and prefabricated half-cylinder-shaped pressed parts consisting of low-melting composite-glass solder, which have thermal expansion properties adapted to the metallic material of the feedthrough sleeve. A portion of the fiber optic light guide is sealed in this feedthrough device between these prefabricated half-cylinder-shaped pressed parts after removal of at least one protective layer or coating provided on this portion of the fiber optic light guide.

The low-melting composite-glass solder preferably has a thermal expansion coefficient of from 4.3 to 5 ppm/K and a processing temperature during sealing of under a Curie temperature of the invar alloy.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE PREFERRED EMBODIMENTS

Figure 1:
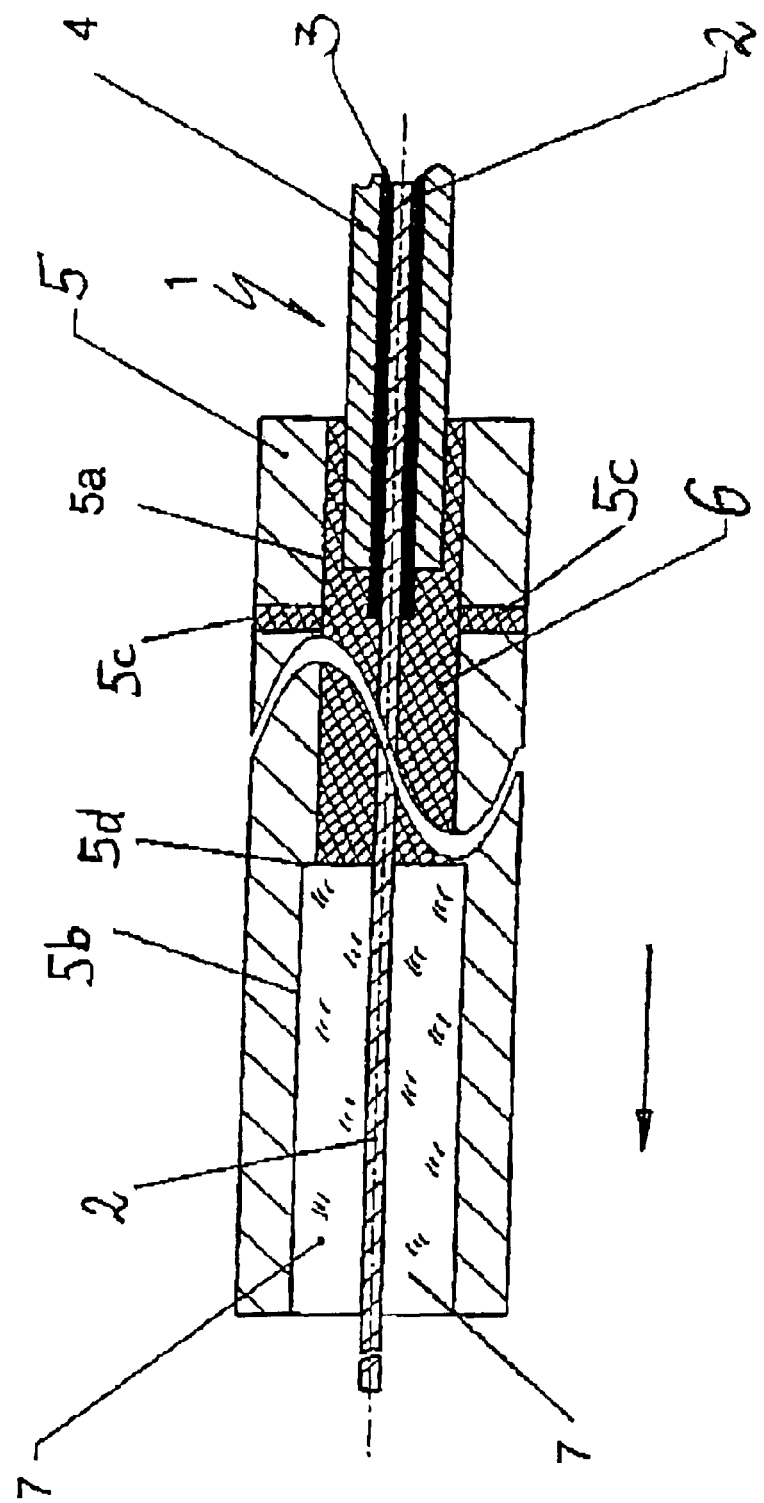
FIG. 1 is a longitudinal cross-sectional view through a feedthrough sleeve with a fiber optic light guide sealed in it with glass solder, which has been made according to the method of the invention.

FIG. 1 is a longitudinal cross-sectional view of a preferred embodiment of a hermetically sealed feedthrough device for feeding a fiber optic light guide through a wall with a feedthrough sleeve made from a special metal alloy. The fiber optic light guide is fused and/or hermetically sealed in the feedthrough sleeve by means of a special solder glass. The metallic feedthrough sleeve itself is sealed in an opening through the wall (not shown) with known solder methods. The wall preferably comprises the same material as the feedthrough sleeve, so that no mechanical stresses develop because of different thermal expansion coefficients. This avoids endangering the permanence of the hermetic seal.

Figure 2:
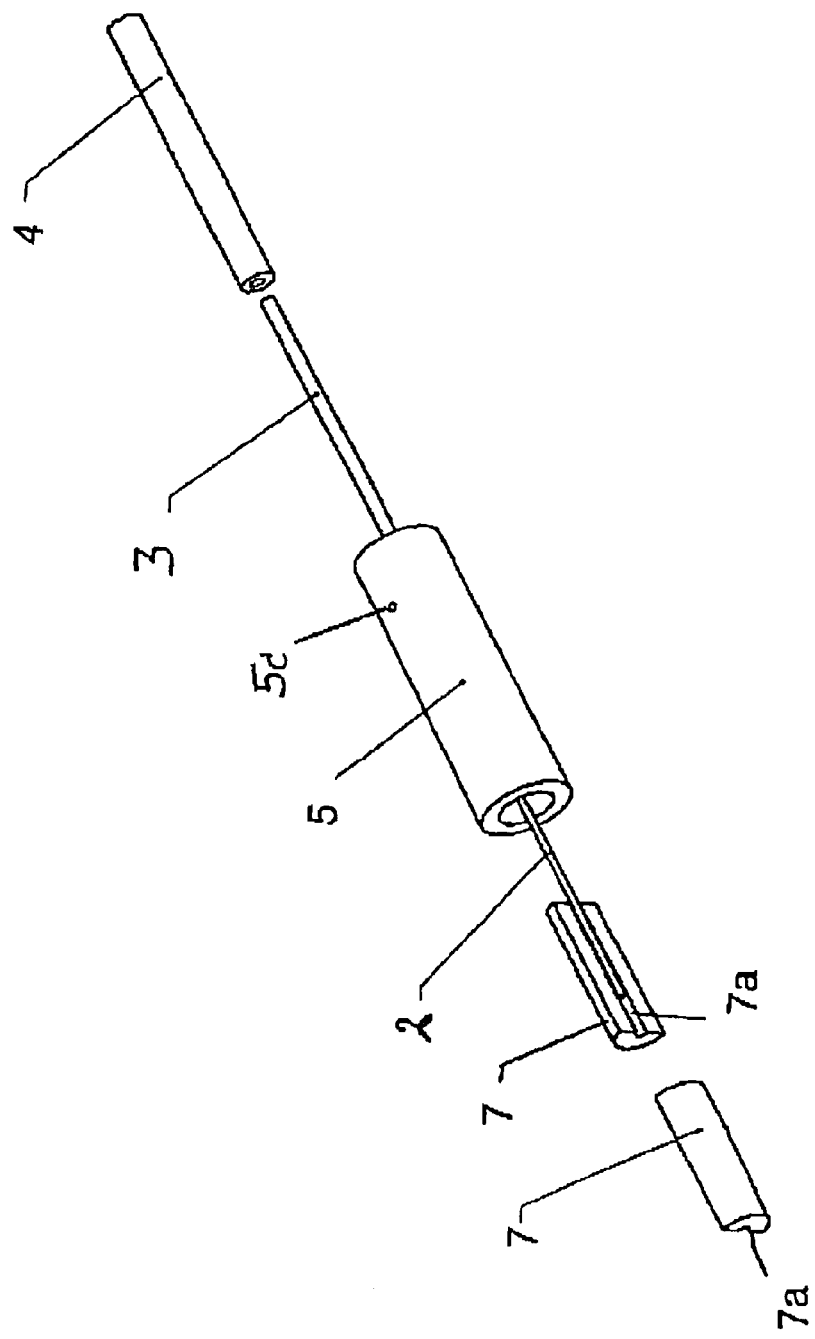
FIG. 2 is an exploded perspective view of some of the component parts of the hermetically sealed feedthrough device, which is shown in FIG. 1.
Figure 3:
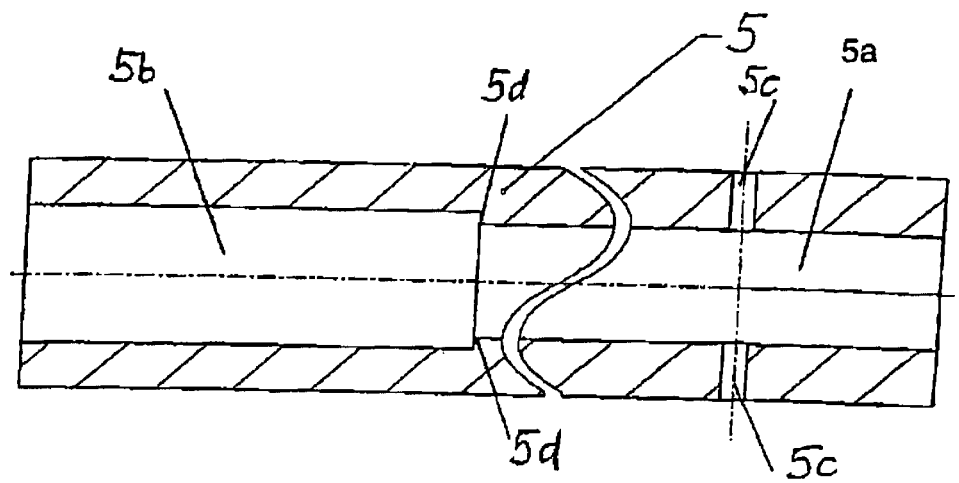
FIG. 3 is a longitudinal cross-sectional view of both axial sections of the feedthrough sleeve.
Figure 4:
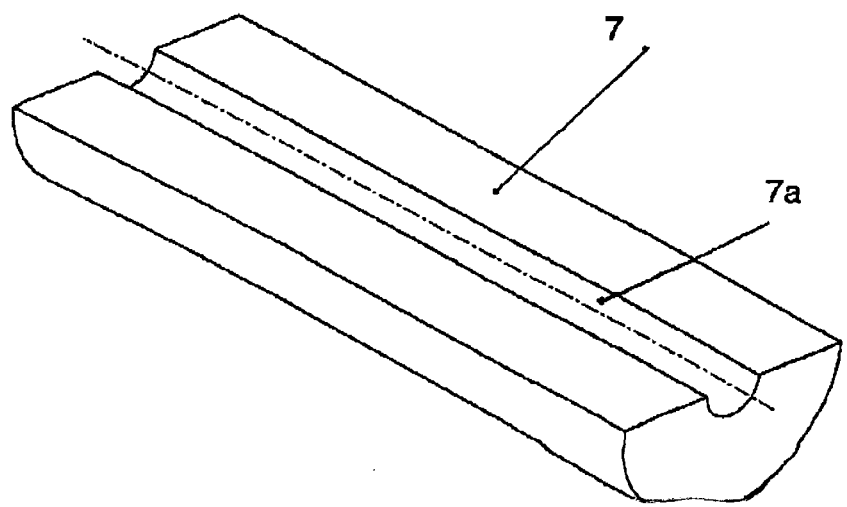
FIG. 4 is a perspective view of one prefabricated half-cylinder-shaped pressed part made of low-melting composite-glass solder with an axial groove, two of which are assembled in the feedthrough device shown in FIG. 1 around the exposed or stripped optical fiber in respective grooves of the pressed parts.
Figure 5:
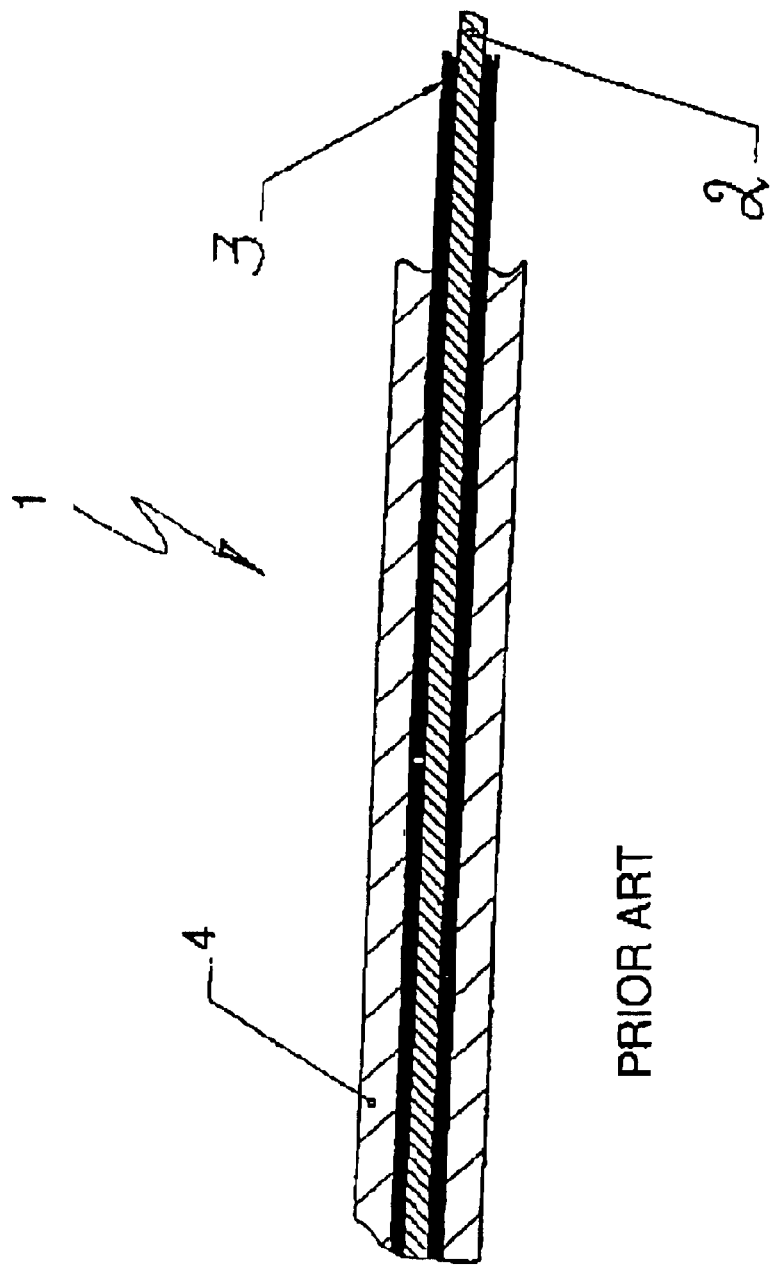
FIG. 5 is a cross-sectional view through a conventional fiber optic light guide with a glass core and a jacket and/or protective layer.

FIG. 2 is an exploded perspective view of component parts of the feedthrough device and/or hermetically sealed feedthrough according to FIG. 1, which are shown in detail separated from each other in FIGS. 3 to 5.

The hermetically sealed feedthrough device according to the invention generally is a glass/metal feedthrough. The term "glass/metal feedthrough" is generally understood in electronics and electrical engineering to be a vacuum-tight seal or fusion of glass to metal for passing an electrical conductor or conductors in an insulated fashion through a hermetically encapsulated housing. In the typical glass/metal feedthrough a prefabricated sintered glass part is fused in an outer metal part and one or more metallic inner conductors are fused or sealed in the glass part.

Because of differences in thermal expansion that exist between glass and metal it is unavoidable that mechanical stresses develops when they are fused together. In the so-called "adapted glass/metal feedthrough" one provides, for example, that stresses of this sort do not lead to weakening of the fused-together feedthrough device. For diathermic adaptation of a glass/metal seal the thermal expansion coefficients α of the glass and metal parts must largely correspond to each other or must agree between room temperature and the transformation temperature of the glass. Thus the mechanical stresses in the fused together assembly during the cooling of the feedthrough into the solidified range for the glass (viscosity range between $10^{13}$ and $10^{14.5}$ dPas) at room temperature do not exceed the strength limits permitted for glass. By selecting optimum fabrication conditions these glass/metal feedthroughs or feedthrough devices are practically stress-free at room temperature.

The methods and materials known for the adapted sealing together of electrical conductors are however not transferable (useable) in regard to the other materials and substantially reduced dimensions for sealing a fiber optic light guide in a metallic sleeve.

The conventional fiber optic light guide 1 shown in FIG. 5 is typical of modern glass fiber cable. This fiber optic light guide 1, also called an optical fiber guide, has a glass or optical fiber 2 with a typical outer diameter of 125 μm and a quartz glass core of 50 μm. An inner plastic protective layer 3 adheres to the glass fiber or optical 2. The fiber optic light guide 1 also has an outer removable plastic jacket 4, which forms an outer protective sleeve.

As shown especially in FIG. 1 the fiber optic light guide 1 is adapted to and sealed in a metallic feedthrough sleeve 5.

This feedthrough sleeve 5, which is shown in detail in FIG. 3, comprises a material with a very low thermal expansion coefficient ($\alpha \cong 5$ ppm/K). The material VACON® of the Vacuum-melt firm is particularly preferred as this material. This material is a special fusion alloy for hard glass and ceramics, which has a linear thermal expansion coefficient that is almost zero, which provides control of the thermal expansion behavior. This alloy has a chemical composition in percent by weight of Ni~29%; Co, 17–23%; Mn, 0.25%; Si, ~0.2%; C,<0.02 and iron (remainder). This alloy is registered under the registration numbers 1.3981 and 1.3982.

These materials based on Ni-Co-Fe alloys are also offered by other firms, e.g. from Westinghouse Electric Corporation under the trademark KOVAR®. Other trade names are Therlo, Rodar, Nicoseal, Sealvac-A, Nilo K and Dilver P. They are described in firm data sheets and materials handbooks, e.g. in "Handbook of Materials and Techniques for Vacuum Devices, by Walter H. Kohl, published by Reinhold Publishing Corporation, 430 Park Avenue, New York, N.Y. 10022. The small thermal expansion of these alloys is based on the unusual expansion properties of the Fe—Ni—Co system, Fe—Ni—Cr system and Fe—Ni system. The invar effect (positive vacuum magnetostriction), which is effective up to the Curie point, causes the reduced or small thermal expansion of these alloys. The alloy Ni—Fe 42 is thus also usable.

Typically the housing of the electro-optic arrangement, through which the sleeve 5 is guided, comprises this alloy so that thermo-mechanical stresses between the sleeve and the housing wall are eliminated.

The feedthrough sleeve 5 may be gold coated to facilitate sealing it into the housing wall by soldering techniques. It has two axial sections 5a, 5b with different interior diameters. The throughgoing and sealed optical fiber light guide 1 complete with all parts is first received in the entrance-side section 5a, which has a smaller diameter than that of the outlet-side section 5b. In further processing steps the outer removable plastic jacket 4 is removed and after that the adherent plastic protective layer 3 is also removed from part of the light guide 1, so that only the "stripped" or "de-coated" glass fiber 2 is received in about half of the first section 5a and in the entire second section 5b.

The feedthrough sleeve 5 has further openings 5c for filling of the first section 5a with, e.g., epoxy resin 6, as a strain relief means for the glass fiber. Two half-shell sections 7 made from composite-glass solder adapted to the material of the feedthrough sleeve and in the form of half-cylinder-shaped-glass-solder pressed parts are received in the second section 5b. The shoulder 5d at the transition between both sections 5a, 5b of the sleeve acts to position both half-cylinder-shaped-glass-solder pressed parts 7 in the feedthrough sleeve. One of these half-cylinder-shaped-glass-solder pressed parts 7 is illustrated in more detail in FIG. 4.

The half-cylinder-shaped-glass-solder pressed part 7 shown in FIG. 4 has a respective central semicircular axial groove 7a, in which the de-coated glass fiber 2 is inserted or embedded. These half-cylinder-shaped-glass-solder pressed parts 7 facilitate the "proper" bonding or fusion of the optical fiber 2 in the metallic feedthrough sleeve 5, i.e. form the fused solder acting as a hermetic seal between the glass or optical fiber 2 and the sleeve 5. The half-shell-shaped-glass-solder pressed parts 7 comprise the low-melting composite-glass solder with thermal expansion properties adapted to the material of the feedthrough sleeve. Their outer diameter is determined by the inner diameter of the sleeve 5 in the second section 5b and their inner diameter, i.e. the diameter of the central axial groove 7a, is determined by the outer diameter of the glass or optical fiber 2. The maximum length is limited according to pressing or molding technology to about three times the outer diameter.

Generally the glass-solder pressed parts are manufactured according to press/sinter technology methods for use in electronics or electronic engineering as glass molded parts for making hermetic seals. The complex forms required for this type of application and the narrow or close tolerances cannot be made, or at least cannot be made economically, with hot molding methods otherwise used in glass manufacturing. The method using glass powder or glass granulate in press/sinter technology permits a substantially more economical production with higher dimensional stability. Glass ground into powder is not immediately suitable for dry pressing. The glass powder, which is not plastic by itself, is put in pourable and pressable condition by addition of binders. This so-called glass press granulate is made by mixing fine grained glass powder ($d_{50}$ of about 10 to 20 $\mu$m) with organic binders (and plastification) in spray-drying methods.

For this purpose the glass powder together with pigment and/or expansion reducing inert filling material, as needed, is suspended in an aqueous binder emulsion. This spray slurry is then sprayed through a nozzle into the chamber of the spray drier. The droplets arising dry to granulate in a counter flow of drying gas. The grain size of the press granulates obtained is between 80 $\mu$m and 350 $\mu$m.

After that the press granulate is put in the desired form in an uniaxial press in a drying press process. The proper press tool comprises a press matrix and upper and lower dies. According to the complexity of the pressed items the dies can also be divided several times. The filling of the mold with granulate takes place by means of a filling shoe. The actual compacting then occurs by scattering downward motion of the upper die (pressing on one side) or by simultaneous motion of the upper and lower dies against each other (pressing on both sides). The compacting (ratio of the filling depth with granulate to the height of the green product after pressing) is about 2.5:1. After that the pressed body is removed by means of an ejector as the "green product".

In order to guarantee a uniform compression and thus a homogeneous sinter contraction, the ratio of the height (extent in the pressing direction) to the diameter of the glass pressed part should not be arbitrarily large. The limit for the finished body or part with a not-too-small wall thickness is in the vicinity of about 3:1.

To make form-stable sintered glass parts after pressing the green product (glass pressed part) the binder is removed from the green product in a special oven (usually a continuous oven) and sintered to its final dimensions. In order to guarantee a complete combustion of the binder, the process follows a special temperature/time curve, during which the green product is first heated at a moderate heating rate at the burn-out temperature of the binder. After the binder is completely burned out, the pressed parts are heated further at a higher temperature, at which the actual sintering to compacted glass parts occurs. This temperature corresponds thus to a temperature, at which the corresponding glass has a viscosity of about $10^8$ to $10^9$ dPas. The sinter contraction (difference between the dimensions of the sintered glass part and the green glass pressed body) is about 14 percent.

The manufacture of this sort of glass-solder-pressed part, which is a sintered glass molded part, is problematical for the feedthrough of a single optical or glass fiber. A glass solder pressed part with an inner diameter, which is in a range usually used for optical glass fibers (about 125 µm) cannot be made in press technology or by molding techniques. The lower limit is at about 350 µm after sintering, depending on the available materials for the press tools or dies.

However it has been surprisingly found according to the invention that it is possible to press the half-shells or pressed parts of the glass solder, which have the shape of a pressed body divided in two or halved along its longitudinal axis. Two of these half-shell sections 7 can then, as shown in the drawing, be assembled around the stripped optical fiber 2 and—as with a standard pressed body with interior holes—placed in a tubular sleeve or passage in a hybrid housing and fused or melted therein.

Also this new technique or method permits sealing at an arbitrary position on a glass fiber strand, not only at the ends of it as in the state of the art. For this purpose the coating on the glass fiber can be removed at the respective predetermined locations. Then the stripped glass or glass fiber is assembled with both half shells and the sleeve.

The actual fusion or melting can then, e.g., occur with the help of an electrically heated filament. However the fusion or melting can also be performed inductively, by means of a focussed IR radiation or in a specially formed oven. The heating means should guarantee local heating, which is concentrated on the seal regions and prevents thermal damage of the protective coating and the outer jacket of the optical fiber.

The half-shell-shape-glass-solder pressed parts 7 comprise, as mentioned above, a low-melting composite-glass solder with thermal expansion properties adapted to those of the material of the feedthrough sleeve 5. This sort of composite-glass solder for making rigid, generally electrically insulating and hermetic connections between materials, such as glass, ceramic or metal, are described especially in the Product Information Sheet Nr. 4823/1 of Schott Glass. A "composite-glass solder" means glass solder, whose thermal expansion is modified. The composite-glass solder permits a lowering of the solder temperature also. The low-melting glass solder designated with the Schott Glass number G 017-339 listed in the above-mentioned Product Information Sheets, for example, has proven to be suitable for making the half-shell-shaped-glass-solder pressed parts. This composite-glass solder comprises a lead-borate glass with an inert expansion-lowering filling material, β-eucryptite, with a linear thermal expansion coefficient, α, according to DIN 52 328, 20–250 of $4.7 \times 10^{-8}$ $K^{-1}$ and a transformation temperature according to DIN 52324 of 325° C. Materials with a thermal expansion coefficient of typically 5 to 6 ppm/K are suitable. Other filling materials are also suitable.

Phosphate glass solder with suitable filling materials can also be used. Also a composite-glass solder with modified lead titanate corresponding to Schott Glas Number G 018-174 can also be used. It is only important for good sealing that the thermal expansion coefficient is in a range from 4.3 to 5 ppm/K and the soldering or processing temperature is below the Curie temperature of the material of the feedthrough sleeve 5.

The disclosure in German Patent Application 101 59 093.8-51 of Dec. 1, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of hermetically sealing a fiber optic light guide in a metallic feedthrough sleeve with glass solder and to a hermetically sealed feedthrough device for a fiber optic light guide made thereby, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for hermetically sealing a fiber optic light guide in a metallic feedthrough sleeve by means of glass solder, said fiber optic light guide comprising a longitudinally extending glass fiber (2) provided with at least one protective layer or coating (3,4), said method comprising the steps of:
   a) preparing a feedthrough sleeve (5) consisting of a metallic material, said metallic material comprising an Invar alloy;
   b) removing said at least one protective layer or coating (3,4) from an arbitrary position on the fiber optic light guide (1) to expose said glass fiber (2);
   c) preparing two half-cylinder-shaped pressed parts (7) by a process according to press/sinter technology from a low-melting composite-glass solder, said low-melting composite-glass solder having thermal expansion properties adapted to said metallic material of the feedthrough sleeve (5), the half-cylinder-shaped pressed parts (7) each having a respective axial groove (7a) with a corresponding cross-section adapted to a diameter of the exposed glass fiber (2);
   d) assembling half-cylinder-shaped pressed parts (7) together with the exposed glass fiber (2) inserted in the grooves (7a) of the half-cylinder-shaped pressed parts in said arbitrary position on the fiber optic light guide; and
   e) melting the half-cylinder-shaped pressed parts (7) together with each other and with the glass fiber (2) and the feedthrough sleeve (5) by local heating.

2. The method as defined in claim 1, wherein said feedthrough sleeve (5) has a first axial section (5a) having a first interior diameter, said first axial section (5a) of said feedthrough sleeve (5) is filled with adhesive around said fiber optic light guide (1), said at least one protective layer or coating (3,4) is removed from only a portion of said fiber optic light guide (1) in said first axial section (5a), said feedthrough sleeve (5) has a second axial section (5b) having a second interior diameter for receiving the half-cylinder-shaped pressed parts (7) and said first interior diameter is less than said second interior diameter.

3. The method as defined in claim 1, wherein said Invar alloy consists of a NI—Co—Fe alloy.

4. The method as defined in claim 1, wherein said Invar alloy consists of a Fe—Ni—Cr alloy or a Fe—NI alloy.

5. The method as defined in claim 1, further comprising gold coating the feedthrough sleeve (5).

6. The method as defined in claim 1, wherein said local heating is for local thermal sealing and takes place by means of an electrically heated incandescent filament, inductively, by means of focused infrared radiation or in an oven.

7. The method as defined in claim 1, wherein the half-cylinder-shaped pressed parts (7) of the composite-glass solder are made from a lead-borate glass powder and an inert expansion-lowering filling material by said process according to said press/sinter technology.

8. The method as defined in claim 7, wherein said filling material is β-Eucryptite.

9. The method as defined in claim 1, wherein said half-cylinder-shaped pressed parts (7) of said composite-glass solder consist of a phosphate glass and an inert expansion-lowering filling material.

10. A hermetically sealed feedthrough device for hermetically sealing a fiber optic light guide (1) in a feedthrough sleeve by means of glass solder, said fiber optic light guide (1) comprising a longitudinally extending glass fiber (2) provided with at least one protective layer or coating (3,4), said hermetically sealed feedthrough device comprising
  a metallic feedthrough sleeve (5) consisting of a metallic material, said metallic material comprising an Invar alloy; and
  prefabricated half-cylinder-shaped pressed parts (7) consisting of low-melting composite-glass solder, said low-melting composite-glass solder having thermal expansion properties adapted to said metallic material of the metallic feedthrough sleeve (5);
  wherein a portion of the fiber optic light guide (1) in an arbitrary position on the fiber optic light guide (1) is sealed between said prefabricated half-cylinder-shaped pressed parts (7) after removal of the at least one protective layer or coating (3,4) provided on said portion at the fiber optic light guide by fusion or melting of said prefabricated half-cylinder-shaped pressed parts (7) together with said glass fiber (2) and with the metallic feedthrough sleeve (5).

11. The hermetically sealed feedthrough device as defined in claim 10, wherein said low-melting composite-glass solder has a thermal expansion coefficient of from 4.3 to 5 ppm/K and a processing temperature below Curie temperature of the Invar alloy during sealing.

12. The hermetically sealed feedthrough device as defined in claim 10, wherein said feedthrough sleeve (5) has a first axial section (5a) having a first interior diameter, said first axial section (5a) of said feedthrough sleeve (5) is filled with adhesive (6) around said fiber optic light guide (1), said at least one protective layer or coating (3,4) is removed from only a part of said fiber optic light guide (1) in said first axial section (5a), said feedthrough sleeve (5) has a second axial section (5b) having a second interior diameter for receiving the half-cylinder-shaped pressed parts (7) and said first interior diameter is less than said second interior diameter.

13. The hermetically sealed feedthrough device as defined in claim 10, wherein the Invar allay is a Ni—Co—Fe alloy, a Fe-Ni—Cr alloy or a Fe—Ni alloy.

14. A method for hermetically sealing a fiber optic light guide in a metallic feedthrough sleeve by means of glass solder, said fiber optic light guide (1) comprising a longitudinally extending glass fiber (2) provided with at least one protective layer or coating (3,4), said method comprising the steps of:
  a) preparing a feedthrough sleeve (5) consisting of a metallic material, said metallic material comprising an Invar alloy;
  b) removing said at least one protective layer or coating (3, 4) from the fiber optic light guide (1) to expose said glass fiber (2);
  c) making two half-cylinder-shaped pressed parts (7) by a process according to press/sinter technology from a low-melting composite-glass solder, said low-melting composite-glass solder having thermal expansion properties corresponding to those of said metallic material of the feedthrough sleeve (5), the half-cylinder-shaped pressed parts (7) each having a respective axial groove (7a) with a corresponding cross-section adapted to a diameter of the exposed glass fiber (2);
  d) assembling said two half-cylinder-shaped pressed parts (7) together with the exposed glass fiber (2) inserted in the grooves (7a) of the half-cylinder-shaped pressed parts; and
  e) melting the half-cylinder-shaped pressed parts (7) together with each other and with the glass fiber (2) and with the feedthrough sleeve (5) by local heating;
  wherein said composite-glass solder comprises a phosphate glass and an inert expansion-lowering filling material.

15. The method as defined in claim 14, wherein said low-melting composite-glass solder has a thermal expansion coefficient of from 4.3 to 5 ppm/K and said local heating is performed at temperatures below a Curie temperature of the metallic material of the feedthrough sleeve (5).

16. The method as defined in claim 14, wherein said feedthrough sleeve (5) has a first axial section (5a) with a first interior diameter and a second axial section (5b) with a second interior diameter, said second axial section receiving the half-cylinder-shaped pressed parts (7), said first axial section (5a) of said feedthrough sleeve (5) is filled with adhesive around said fiber optic light guide (1), said at least one protective layer or coating (3,4) is removed from only a part of said fiber optic light guide (1) in said first axial section (5a) but from all of said fiber optic light guide within said second axial section (5b) and said first interior diameter is less than said second interior diameter.

17. The method as defined in claim 14, wherein said process according to press/sinter technology comprises spray-drying an aqueous emulsion comprising a fine grained phosphate glass powder and an inert expansion-lowering filling material to form a glass press granulate, pressing the glass press granulate in a mold to form a green pressed part and sintering said green pressed part in an oven to form one of the half-cylinder-shaped pressed parts (7).

18. A method for hermetically sealing a fiber optic light guide in a metallic feedthrough sleeve by means of glass solder, said fiber optic light guide (1) comprising a longitudinally extending glass fiber (2) provided with at least one protective layer or coating (3,4), said method comprising the steps of:
  a) preparing a feedthrough sleeve (5) consisting of a metallic material, said metallic material comprising an Invar alloy;
  b) removing said at least one protective layer or coating (3,4) from the fiber optic light guide (1) to expose said glass fiber (2);
  c) making two half-cylinder-shaped pressed parts (7) by a process according to press/sinter technology from a low-melting composite-glass solder, said low-melting composition glass solder having thermal expansion properties corresponding to those of said metallic material of the feedthrough sleeve (5), the half-cylinder-shaped pressed parts (7) each having a respective axial groove (7a) with a corresponding cross-section adapted to a diameter of the exposed glass fiber (2);
  d) assembling said two half-cylinder-shaped pressed parts (7) together with the exposed glass fiber (2) inserted in the grooves (7a) of the half-cylinder-shaped pressed parts; and e) melting the half-cylinder-shaped pressed parts (7) together with each other and with the glass fiber (2) and with the feedthrough sleeve (5) by local heating;
    wherein said composite-glass solder comprises a lead-borate glass and an inert expansion-lowering filling material.

19. The method as defined in claim 18, wherein said low-melting composite-glass solder has a thermal expansion coefficient of from 4.3 to 5 ppm/K and said local heating is performed at temperatures below a Curie temperature of the metallic material of the feedthrough sleeve (5).

20. The method as defined in claim 18, wherein said feedthrough sleeve (5) has a first axial section (5a) with a first interior diameter and a second axial section (5b) with a second interior diameter for receiving the half-cylinder-shaped pressed parts (7), said first axial section (5a) of said feedthrough sleeve (5) is filled with adhesive around said fiber optic light guide (1), said at least one protective layer or coating (3,4) is removed from only a part of said fiber optic light guide (1) in said first axial section (5a) but from all of said fiber optic light guide within said second axial section (5b) and said first interior diameter is less than said second interior diameter.

21. The method as defined in claim 18, wherein said process according to press/sinter technology comprises spray-drying an aqueous emulsion comprising a fine grained lead-borate glass powder and an inert expansion-lowering filling material to form a glass press granulate, pressing the glass press granulate in a mold to form a green pressed part and sintering said green pressed part in an oven to form one of the half-cylinder-shaped pressed parts (7).

* * * * *